Patented Aug. 20, 1935

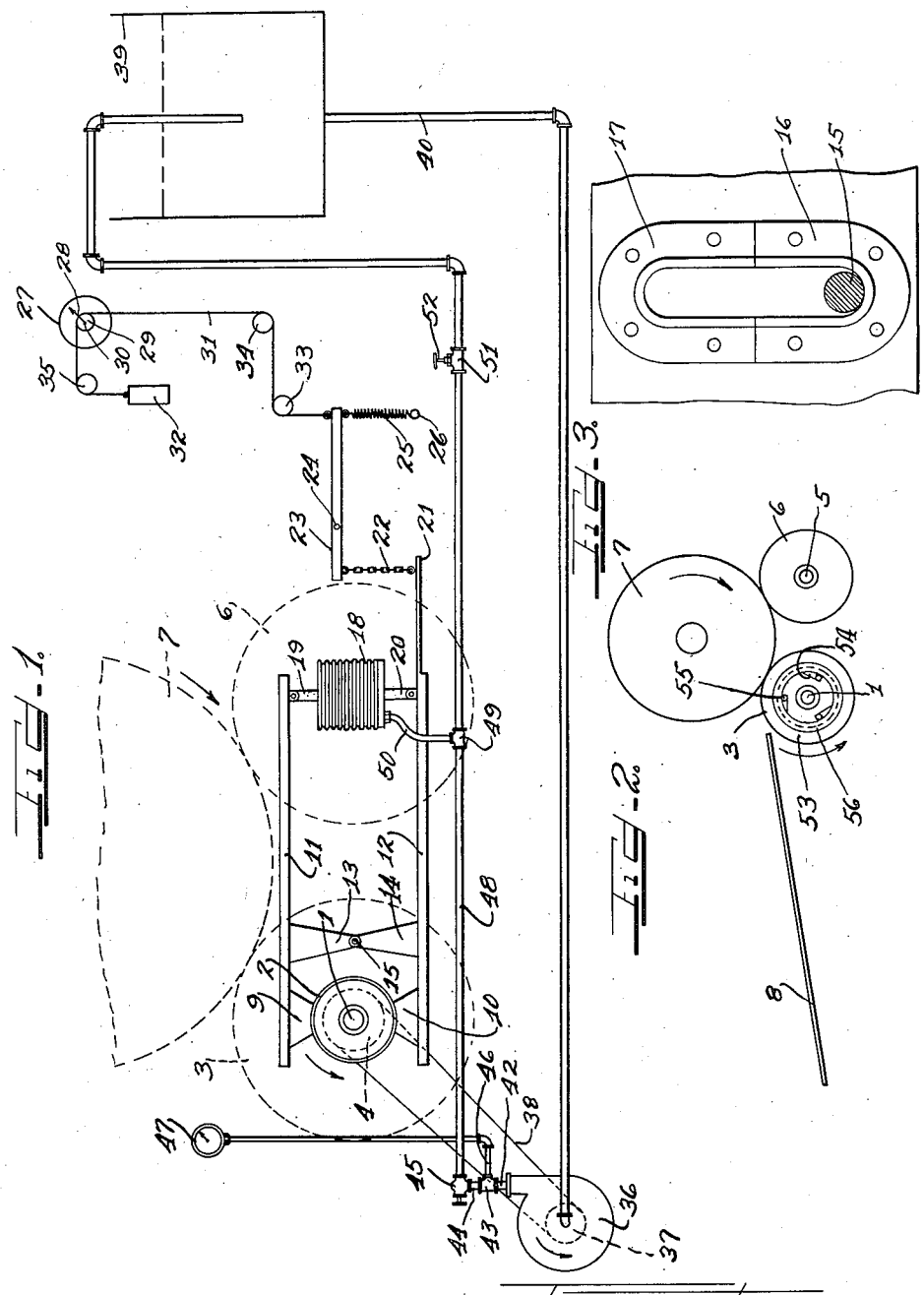

2,012,110

UNITED STATES PATENT OFFICE 2,012,110

AUTOMOBILE TESTING APPARATUS

Jacob L. Shroyer, Oak Park, Ill.

Application February 12, 1934, Serial No. 710,831

2 Claims. (Cl. 265—24)

The present invention relates to an improved testing apparatus useful in garages, filling stations, service stations, and the like, to afford a convenient means whereby an automobile may be driven onto the apparatus to test the efficiency thereof by applying the driving power of the automobile to the testing apparatus and reading the developed horsepower on a suitable gauge, which may be calibrated in horsepower, torque, in foot pounds, or any other suitable manner, and so positioned as to be readily observed.

An object of the present invention is to provide a testing apparatus for automobiles wherein the power developed by the automobile undergoing test, may be readily observed.

Another object of the invention is to provide an automobile testing apparatus wherein the automobile wheels are utilized to operate friction wheels, which in turn operate a centrifugal pump interposed in a fluid pressure system and wherein the pump is utilized for bucking the braking action of the testing apparatus to maintain the operation of the power wheels of the automobile, undergoing test, at a constant speed.

Another object of the invention is to provide an automobile testing apparatus wherein the driving wheels of the automobile are positioned in driving contact with friction wheels of the apparatus, for operating brake mechanism, together with fluid pressure control means wherein a centrifugal pump is utilized to buck the brake action of the testing apparatus for maintaining the operation of the automobile at a constant speed, and wherein the power developed by the automobile under such conditions may be translated to a suitable gauge for ready observation.

A still further object of the present invention is to provide an automobile testing apparatus wherein the drive wheels of the automobile undergoing test are utilized for actuating a centrifugal pump and a brake mechanism, and wherein the action of the brake mechanism is controlled by the pressure created by the pump, and wherein a constant speed, at which the automobile wheels operate while undergoing test, is maintained by the centrifugal pump bucking the braking action without the use of governors, or other instrumentalities, together with means whereby the constant speed may be varied to represent any given rate.

Generally speaking the invention contemplates an automobile testing apparatus including friction wheels mounted on a shaft on which is also secured a brake drum, and from which shaft a centrifugal pump is driven by positive connection and wherein the brake means engaging the drum are actuated by fluid pressure responsive to the action of the pump and wherein the fluid under pressure is controlled to maintain the speed of the automobile wheels at a constant speed, after the wheels have once reached such speed.

The above, other, and further objects of the invention will be apparent from the following description, accompanying drawing, and appended claims.

The accompanying drawing illustrates, diagrammatically, an apparatus embodying the principles of the present invention and the views thereof are as follows:

Figure 1 is an elevational view, diagrammatically shown, with apparatus constructed in accordance with the principles of the present invention and showing the relationship of the various parts entering into the apparatus.

Figure 2 is a schematic elevational view, on a reduced scale from that shown in Figure 1, showing an automobile driving wheel engaging a friction wheel and an idler wheel or roller, on one side of the apparatus.

Figure 3 is a view of one type of mounting for the pivotal points of the brake arms.

The drawing will now be explained.

Figure 1 represents, diagrammatically, an apparatus capable of carrying out the present invention, and as illustrated, includes a shaft 1 which is suitably supported in journals and on which shaft is fixed a brake drum 2 and, near its extremities, friction wheels 3 and a pulley 4.

Adjacent the friction wheels 3, and mounted on stub shafts 5, suitably supported, are idler rollers 6.

At each side of the machine there is one friction wheel or roller 3 and one idler roller 6 to receive therebetween a wheel 7 of the automobile undergoing test.

The apparatus of the present invention is preferably arranged within a pit so that the friction wheels 3 and the idler wheels or rollers 6 are substantially even with the floor or ground surface, so that an automobile may be driven onto and off of the test apparatus at floor or ground level. For convenience an approach platform 8 may be provided, if the apparatus is elevated above the surrounding surface.

For engaging the brake drum 2 with braking actions, there are used brake means, herein illustrated as shoes 9 and 10, engaging respectively the top and bottom of the drum 2, as the same appears in Figure 1. The brake shoes 9 and 10 are carried respectively by brake arms 11 and 12, which have portions 13 and 14 extending towards each other and pivotally connected at their meeting ends by a shaft 15. The extremities of the shaft 15 are carried in brackets 16, arranged adjacent the sides of the pit or frame structure, supporting the apparatus, which brackets have elongated openings 17 so that the shaft 15 may have movement therein in service.

A fluid pressure responsive means, such as a bellows 18 is connected between the extremities of the arms 11 and 12, remote from the ends of the arms carrying the shoes 9 and 10, that is on the opposite side of the pivot 15 from the brake shoes. The bellows is connected to the arms 11 and 12 by means of links 19 and 20 to enable relative movement of the arms during use.

One of the arms, the arm 12 herein illustrated, is provided with an extension 21 near the end of which a chain 22 is attached. The other end of the chain is connected to a lever 23, pivoted intermediate its ends at 24, while the other end of the lever is connected to one end of a gauge spring 25. One end of the spring is fixed at 26 to some suitable portion of the apparatus.

A gauge 27, calibrated in foot pounds, is provided with a movable pointer 28, pivoted at 29 to the axis of a drum 30 over which passes a flexible cable 31, which cable is connected at one end to the lever 23 adjacent the gauge spring 25. Attached to the other end of the cable 31 is a weight 32, while suitable pulleys 33, 34, and 35 are provided so that the cable 31 may actuate the drum 30 under influence of the spring 25 and the weight 32.

The fluid pressure system as illustrated, includes a centrifugal pump 36. To the shaft of its impeller is attached a pulley 37, a belt 38 connects the pulley 37 of the pump with the pulley 4 on the shaft 1 so that the pump is actuated whenever the shaft 1 is rotated by the power wheels 7 of the automobile undergoing test.

While the centrifugal pump has been shown as driven from the shaft 1 by means of pulleys and a belt, it is of course understood that any other positive driving connection could be utilized for accomplishment of the desired results.

A tank 39 is provided for containing a supply of fluid for the fluid pressure circuit. A pipe 40 is connected to the tank and to the intake side of the pump 36 for supplying fluid to the pump.

The discharge side of the pump has a pipe 42 connected to it, and in turn connected to a T 43, shown as a three-way T, to the opposite branch of which T from the pipe 42, a short pipe 44 communicates with a hand valve 45. From the third branch of the T 43 a pipe 46 leads to a gauge 47.

A pipe 48 is connected to the hand valve 45 and constitutes the return portion of the fluid pressure circuit, which pipe empties into the supply tank 39.

Interposed in the pipe 48 is a connection 49 from which a hose or other flexible conduit 50 leads to the bellows 18, whereby fluid under pressure is admitted to or withdrawn from the interior of the bellows. Interposed in the pipe 48, between the connection 49 and the supply tank 39 is a regulating valve 51 having a handwheel 52 for manual operation.

The purpose of the valve 51 is, by manipulation of the handwheel 52, to restrict the flow of fluid from the pump 36 to the supply tank 39, and thereby regulate the amount of fluid under pressure supplied to the bellows 18. By manipulating the valve 51, an amount of fluid may be admitted to the bellows 18, to maintain the speed of the shaft 1 constant in accordance with the fluid so admitted, and thus enables regulation of the system to permit operation of the automobile wheels 7 to represent any constant speed of the automobile.

Any suitable fluid may be employed, but it has been found that a mixture of alcohol and water is satisfactory for the operation of the apparatus under varying temperature and other conditions.

Because of the floating mounting of the pivotal shaft 15 of the brake arms 11 and 12, when the brake is applied to the drum 2, there is a tendency of these arms to rotate with the drum. The provision of the flexible conduit 50 as a connection between the pipe 48 and the bellows 18, allows such rotation of the arms, or such tendency to rotate, without disrupting the connection between the pipe 48 and the bellows.

When the parts are at rest, the pivotal shaft 15 for the brake arms 11 and 12 is disposed in the lower ends of the recesses 17 of the brackets 16 and the brakes are released from braking engagement with the drum 2.

In order to afford traction for an automobile to be driven off of the test apparatus, in reverse direction from entry, an overrunning clutch arrangement is provided in the friction wheels 3. This overrunning clutch is shown diagrammatically in Figure 2.

Keyed or otherwise permanently secured to the shaft 1 are plate 53, which plates are provided with a series of notches 54, in every one of which notches is a roller 55. A ring 56 is fixed to the frame adjacent each friction wheel 3 and cooperates with the plates 53 to drive the shaft 1 when the plates 53 are rotated in the direction of the arrows as shown in Figure 2.

The directions of rotation of the automobile wheels 7, the friction wheels 3, and the centrifugal pump 36, are shown by arrows, in the several figures, and represent the direction of rotation while the automobile wheels 7 are being driven in a forward direction. In this case, the overrunning clutch in the friction wheels or rollers 3 connects the friction wheels to the shaft 1 to drive it and through it operate the centrifugal pump 36. When a test is completed, the motor of the automobile is stopped, or else the transmission is actuated to throw out the forward gear, generally the high speed gear, whereupon the automobile wheels 7, and the friction wheels 3 come to rest. When the reverse gear of the automobile is put in mesh, and the clutch actuated to back off the vehicle, the automobile wheels 7 then rotate the friction wheels 3 in the direction opposite to that shown by the arrows in Figure 2, whereupon the overrunning clutch, heretofore described, comes into action to prevent rotation of the friction wheels 3 in clockwise direction, as viewed in Figure 2. This clutching of the friction wheels 3 therefore forms sufficient traction for the automobile wheels 7 to back off of the test apparatus.

The operation of the apparatus is as follows:

Generally speaking the pressure created by a centrifugal pump is the square of the speed of the pump.

An automobile is driven onto the test apparatus of the present invention, with the driving wheels 7 thereof in engagement with the friction wheels 3 and idler rollers 6 whereupon the vehicle is in position for test. The gears of the automobile are then actuated to connect the driving wheels 7 to the engine of the automobile through the high speed gear whereupon as soon as the clutch is let in, rotation of the shaft 1 is caused by rotation of the automobile wheels 7. The engine throttle or accelerator is then fully opened. This in turn causes rotation of the pump 36 to thereby build up pressure in the fluid pressure circuit.

As the speed of the shaft increases the pressure created by the pump increases to a point for which the apparatus has, by manipulation of valve 51, been set to cause the brakes to maintain the speed of the shaft at a constant speed, say 35 miles an hour. Building up of fluid pressure in the circuit, causes building up of pressure within the bellows 18, causing expansion thereof with a resultant application of the brake shoes 9 and 10 against the drum 2. Application of the brakes, in the manner stated, tends to cause the arms 11 and 12 to rotate about the shaft 1 as an axis, this motion therefore is reflected in the upward movement of the extension 21 of the arm 12, and thereupon the gauge spring 25 comes into action to lower the right hand end of the lever 23, as viewed in Figure 1, and thus move the pointer 28 of the dial 27.

The gauge or dial 27 is so coordinated as to correctly represent the power effort developed by the automobile undergoing test.

During the time the apparatus is coming up to the desired constant speed, say 35 miles an hour, the pump delivers fluid under pressure to the bellows 18, the amount of which is controlled by the setting of the hand valve 51. Some of the fluid returns to the supply tank 39.

The setting of the hand valve 51 is such that as pressure is built up by the pump 36, in the pipe 48, a maximum amount of fluid under pressure is delivered to the bellows 18. This maximum amount of fluid under pressure therefore regulates the maximum power effort of the braking system and thereby maintains the rotation of the brake drum and its shaft 1 at a constant speed as represented by the pressure within the bellows 18.

As soon as the automobile wheels reach the constant speed for which the apparatus is set, namely 35 miles an hour, no further pressure is created within the bellows 18, this then determines the maximum movement of the arms 11 and 12, about the shaft 1 as an axis and the displacement of the pointer 28 of the gauge 27, as caused by the gauge spring 25, represents the mechanical effort developed by the automobile at that speed.

As soon as the test is completed, the automobile wheels 7 are brought to rest whereupon the shaft 1 comes to rest and the pump 36 also. Some of the fluid within the bellows 18 then flows out through the hose 50 and returns to the supply tank 39. The automobile is then backed off the apparatus in the manner heretofore described.

During the test just described the valve 45 is opened to allow the full output of the pump admission to the pipe 48. Should it be desired to ascertain the revolutions per minute of the pump 36, and consequently the shaft 1, the valve 45 may be closed to shut off fluid to the pipe 48, whereupon pressure is built up in the pipe 46 which pressure of course is representative of the speed of the pump and consequently the shaft 1, and indicates such pressure on the gauge 47. Because of the relationship between the pressure and the speed of the pump, and consequently the speed of the shaft, the gauge 47 may be calibrated in miles per hour. During test the valve 45 is open and the gauge 47 is inactive.

Any automobile undergoing test will come up to some constant speed without regulating anything. The use of the valve 51 enables adjustment of the test apparatus so that the automobile undergoing test may be operated at any desired constant speed.

The term "constant", as herein used, as applied to speed, is used to represent the speed of the friction wheels as stabilized by the action of the braking energy of the tester apparatus, and it is to be understood that such speed is not the same for all vehicles in all conditions of test. For example, in one test, such constant speed might be 15 M. P. H.; a second test might develop a constant speed of 35 M. P. H., while another a constant speed of 50 M. P. H. The constant speed mentioned is that at which the driving energy of the automobile wheels is stabilized or balanced by the braking energy of the tester apparatus and varies for cars of different power.

Tests have determined the amount of tester loads to be applied to be equivalent to the load the engine would have to carry to drive the car at the speed at which the test is made.

The gauge 47 is used to check the speedometer on the vehicle undergoing test. The valve 45 is closed and the car operated at any speed and the reading of the speedometer at that speed may be compared with the reading on gauge 47.

The term "bellows" has been used herein generically, and not by way of limitation, and contemplates any fluid pressure responsive means suitable for the purpose.

Claims generic to the present invention are included in copending application Serial No. 243,796.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. An automobile tester including in combination, a shaft, a brake drum on said shaft arranged to be driven by automobile wheels undergoing test, brake shoes engageable with said drum, arms carrying said brake shoes, fluid pressure actuated means operably associated with said arms and responsive to the speed of said drum for varying the braking effect of said brake shoes on said drum, said fluid pressure means including a centrifugal pump positively driven by the shaft, a bellows connected to the brake arms and communicating with said pump, said pump building up pressure in said bellows by increased speed of said drum for varying the braking effect of said brake shoes to stabilize the speed of said drum and buck the action of the brakes, and a valve operable independently of the speed of the tester for regulating the amount of fluid under pressure admitted to said bellows.

2. An apparatus for testing torque developed by the driving wheels of an automotive vehicle at a constant speed, said apparatus including brake means and means for balancing the driving energy of the vehicle wheels by said brake means to stabilize the vehicle wheel speed, said balancing means including a shaft, a brake drum on said shaft engageable by said brake means, friction wheels on said shaft for driving it by said vehicle wheels, a fluid circuit, a pump in said circuit positively driven from said shaft, and fluid pressure responsive means connected to said pump and to said brake means, said pump actuating said brake means by means of said fluid pressure responsive means to balance the driving energy of the vehicle wheels by the braking energy of the apparatus whereby variations of the speed of the drum and shaft are proportioned to the driving energy of the vehicle wheels, and means operable independently of the speed of the apparatus for varying the amount of fluid supplied to said fluid pressure responsive means for thereby varying the operation of said apparatus to represent any given rate of constant automobile speed.

JACOB L. SHROYER.